US010023315B2

(12) United States Patent
Kuyper et al.

(10) Patent No.: US 10,023,315 B2
(45) Date of Patent: Jul. 17, 2018

(54) PASSENGER SEAT TABLE ASSEMBLY

(71) Applicant: B/E Aerospace, Inc., Wellington, FL (US)

(72) Inventors: John Kuyper, Tucson, AZ (US); Ian L. Frost, Tucson, AZ (US)

(73) Assignee: B/E Aerospace, Inc., Winston-Salem, NC (US)

( * ) Notice: Subject to any disclaimer, the term of this patent is extended or adjusted under 35 U.S.C. 154(b) by 161 days.

(21) Appl. No.: 15/189,506

(22) Filed: Jun. 22, 2016

(65) Prior Publication Data
US 2016/0376008 A1 Dec. 29, 2016

Related U.S. Application Data

(60) Provisional application No. 62/183,805, filed on Jun. 24, 2015.

(51) Int. Cl.
*B64D 11/06* (2006.01)
*A47B 5/00* (2006.01)

(52) U.S. Cl.
CPC .......... *B64D 11/0605* (2014.12); *A47B 5/006* (2013.01); *B64D 11/06* (2013.01); *B64D 11/0638* (2014.12)

(58) Field of Classification Search
CPC .. B64D 11/0605; B64D 11/638; B60N 3/001; B60N 3/002; B60N 3/004; B60N 3/007; A47B 5/006; A47B 31/06
See application file for complete search history.

(56) References Cited

U.S. PATENT DOCUMENTS

| | | | | |
|---|---|---|---|---|
| 7,178,871 B1 * | 2/2007 | Round | ................... | B60N 2/242 297/217.3 |
| 7,607,726 B2 * | 10/2009 | Orlo | ....................... | B60N 3/004 248/421 |
| 8,020,808 B2 * | 9/2011 | Collins | .................. | B60N 3/002 244/118.5 |
| 8,171,862 B2 * | 5/2012 | Muirhead | .............. | B60N 3/002 108/152 |
| 8,485,470 B2 * | 7/2013 | Hankinson | ............. | B64D 11/06 244/118.6 |

(Continued)

FOREIGN PATENT DOCUMENTS

| | | |
|---|---|---|
| DE | 102013112336 A1 | 5/2015 |
| EP | 2353931 A2 | 8/2011 |

(Continued)

OTHER PUBLICATIONS

PCT/US2016/038706 International Search Report dated Aug. 19, 2016.

*Primary Examiner* — Joseph W Sanderson
(74) *Attorney, Agent, or Firm* — Clements Bernard Walker PLLC

(57) ABSTRACT

A passenger seat table assembly including a table movable between a fully stowed position and a fully deployed position through at least one intermediate position in which the table rotates relative to a support arm, wherein the table rotates in a first direction relative to the support arm as the table moves from the fully stowed position toward the at least one intermediate position, and rotates in a second direction opposite the first direction as the table moves from the at least one intermediate position toward the fully deployed position.

18 Claims, 10 Drawing Sheets

(56) References Cited

U.S. PATENT DOCUMENTS

| | | | | |
|---|---|---|---|---|
| 8,528,968 B2* | 9/2013 | Moulton | B64D 11/0605 297/147 |
| 8,616,137 B2* | 12/2013 | Collins | B60N 3/002 108/137 |
| 8,622,345 B2* | 1/2014 | Collins | B64D 11/06 244/118.6 |
| 8,662,447 B2* | 3/2014 | Johnson | B64D 11/06 244/118.5 |
| 8,979,189 B2* | 3/2015 | Henshaw | A47B 83/02 297/135 |
| 9,102,410 B2* | 8/2015 | Frost | B64D 11/06 |
| 9,114,879 B2* | 8/2015 | Ligonniere | B64D 11/06 |
| 9,216,665 B2* | 12/2015 | Herault | B60N 2/00 |
| 9,469,405 B2* | 10/2016 | Henshaw | B60N 3/002 |
| 9,609,946 B2* | 4/2017 | Gow | A47B 5/006 |
| 9,708,066 B2* | 7/2017 | Thompson | B64D 11/0638 |
| 9,776,723 B2* | 10/2017 | Gow | B64D 11/0605 |
| 9,815,556 B2* | 11/2017 | Helwig | B64D 11/0638 |
| 2007/0145791 A1 | 6/2007 | Strasser | B60N 3/002 297/162 |
| 2009/0223417 A1* | 9/2009 | Muirhead | B60N 3/002 108/13 |
| 2010/0171350 A1* | 7/2010 | Large | B60N 3/002 297/217.3 |
| 2010/0301162 A1* | 12/2010 | Hankinson | B64D 11/06 244/118.6 |
| 2012/0133180 A1* | 5/2012 | Moulton | B64D 11/06 297/135 |
| 2012/0167807 A1* | 7/2012 | Legeay | B60N 3/002 108/41 |
| 2012/0318918 A1* | 12/2012 | Johnson | B64D 11/06 244/118.6 |
| 2013/0076082 A1* | 3/2013 | Herault | B60N 2/00 297/173 |
| 2013/0093221 A1* | 4/2013 | Ligonniere | B64D 11/06 297/173 |
| 2013/0248653 A1* | 9/2013 | Round | B64D 11/06 244/118.6 |
| 2014/0035330 A1* | 2/2014 | Henshaw | B60N 3/002 297/174 R |
| 2014/0145477 A1* | 5/2014 | Ersan | B64D 11/06 297/145 |
| 2014/0300148 A1* | 10/2014 | Frost | B64D 11/06 297/173 |
| 2015/0284088 A1* | 10/2015 | Gow | B64D 11/06 297/174 R |
| 2015/0284089 A1* | 10/2015 | Gow | B64D 11/0605 297/147 |
| 2015/0321592 A1* | 11/2015 | De Morais | B64D 11/06 297/147 |
| 2015/0351528 A1* | 12/2015 | Gow | B60N 3/002 297/135 |
| 2016/0090180 A1* | 3/2016 | Thompson | B60N 3/002 297/144 |
| 2016/0288911 A1* | 10/2016 | Helwig | B64D 11/0638 |
| 2017/0021932 A1* | 1/2017 | Marais | B64D 11/0638 |

FOREIGN PATENT DOCUMENTS

| | | |
|---|---|---|
| EP | 2353931 A3 | 8/2011 |
| WO | 2008031506 A1 | 3/2008 |

* cited by examiner

PASSENGER SEAT TABLE ASSEMBLY

CROSS-REFERENCE TO RELATED APPLICATION

This Application claims priority from U.S. Application No. 62/183,805 filed Jun. 24, 2015, the entirety of which is incorporated by reference herein.

TECHNICAL FIELD AND BACKGROUND OF THE INVENTION

The present invention relates generally to a deployable table associated with a passenger seat of the type found in a premium class passenger suite, and more particularly, to a table movable between a stowed position and a use position through intermediate positions in which the table rotates relative to a support arm to provide room for a passenger to exit the seat in the space between the seat and the table without having to fully stow the table.

Coach, business and luxury seating classes onboard commercial airliners offer varying levels of comfort and amenities for traveling passengers. Passenger seats in coach and business seating classes can be arranged into rows of laterally-adjacent seats, while luxury seating classes can include individual passenger suites separated by privacy walls. Regardless of the seating class, each seat onboard a commercial airliner is typically equipped with a table configured to stow during taxi, take-off and landing (TTOL), and deploy for use during flight. Tables associated with coach and business seating classes can deploy from a stowed position against a forward seatback or from an armrest positioned alongside the seat. Tables in passenger suites can deploy from furniture and consoles positioned forward of or alongside the seat.

Regardless of the table stowage location, conventional tables require the table to be fully stowed to permit ingress/egress from the seat. Stowing a table requires having to change the orientation of the table (e.g., from horizontal to vertical) or having to fold the table on itself, and therefore requires first removing any items on the table. Removing and stowing items elsewhere can be difficult and problematic, particularly when the items are food and beverages and the passenger living space lacks alternate storage locations. Therefore, what is needed is a table movable to an intermediate deployed position in which the passenger can exit the seat without having to disturb or stow the table.

BRIEF SUMMARY OF THE INVENTION

It is an object of the invention to provide a deployable table for use by a passenger seated in a passenger seat.

It is another object of the invention to provide a table that can rotate to allow room for a passenger to exit a seat without having to fully stow the table.

It is another object of the invention to provide a table and support arm configured for infinite adjustability of the table position and angle relative to the seat.

It is another object of the invention to provide a passenger suit wherein a table stows forward of the seat, is guided for movement along a fixture to one side of the seat, and can be moved toward and apart from the seat without having to empty the table.

To achieve the foregoing and other objects and advantages, in one embodiment the present invention provides a passenger seat table assembly including a table movable between a fully stowed position forward of a seat and a fully deployed position over the seat through at least one intermediate position in which the table rotates relative to a support arm to provide room for a passenger to exit the seat between the seat and the table without having to fully stow the table.

In another aspect, the table can be horizontally-oriented and rotatably supported on the support arm, and the support arm can be guided for movement along a fixture positioned to one side of the seat.

In a further aspect, a longitudinal axis of the table can be parallel to a longitudinal axis of the seat when the table is in the fully stowed position, the longitudinal axis of the table can be parallel to the longitudinal axis of the seat when the table is in the fully deployed position, and the longitudinal axis of the table can be at an angle to the longitudinal axis of the seat when the table is in the at least one intermediate position.

In a further aspect, the table can rotate in a first direction relative to the support arm as the table moves from the fully stowed position toward the at least one intermediate position, and can rotate in a second direction opposite the first direction as the table moves from the at least one intermediate position toward the fully deployed position.

In a further aspect, the assembly can include a support arm cam pathway housed in the fixture shaped to guide support arm rotation as the support arm moves relative to the fixture, and a rotation rod cam pathway housed in the fixture shaped to guide movement of a rotation rod which controls rotation of the table relative to the support arm as the support arm moves relative to the fixture, wherein the support arm cam pathway and the rotation rod cam pathway can be non-linear, non-intersecting, and shaped to rotate the support arm based on a predetermined curvature of the fixture and rotate the table based on a position of the support arm relative to the seat.

In a further aspect, movement of the rotation rod relative to the support arm can drive rotational movement of the table about a main support bearing by way of a bearing and slot arrangement.

In a further aspect, the assembly can include a plurality of guide blocks attached to an underside of the support arm that travel outboard of the support arm cam pathway and rotation rod cam pathway, and horizontally-oriented track rollers rotatably attached to the plurality of guide blocks that travel along parallel tracks positioned outboard of the guide blocks.

In a further aspect, the assembly can include a damper assembly including a dampener having a vertically-oriented roller rotatably mounted thereto, the dampener mounted to a mounting plate biased in a direction of one of the parallel tracks, wherein the vertically-oriented roller is forced into contact with the one of the parallel tracks through a range of travel of the support arm.

In a further aspect, a slot can be formed through a side of the fixture and one end of the support arm can extend through the slot into the fixture to engage within the support arm cam pathway and the rotation rod cam pathway.

In a further aspect, the assembly can include a handle mounted to an underside of the support arm or an underside of the table, and can include a catch mounted to the underside of the support arm or the underside of the table arranged to catch a latch as the latch moves past the catch as the support arm moves toward the fully stowed position.

In another embodiment, the present invention provides an aircraft passenger suite including a seat, a fixture positioned to one side of the seat, and a table assembly comprising a table movable between a fully stowed position forward of the seat and a fully deployed position over the seat through at least one intermediate position in which the table rotates relative to a support arm to provide room for a passenger to exit the seat between the seat and the table without having to fully stow the table.

In another aspect, the table can be horizontally-oriented and rotatably supported on the support arm, and a slot can be formed through a side of the fixture and one end of the support arm extends through the slot into the fixture and is guided for horizontal movement along the fixture.

In a further aspect, the suite can include a desk positioned forward of the seat, wherein the table stows underneath the desk when the table is in the fully stowed position.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The present invention provides a table mechanism including a table movable between a fully stowed position and a fully deployed position through at least one intermediate position in which the table rotates relative to a support arm to provide sufficient clearance between the table and seat to allow a passenger to exit the seat without having to stow the table. The table can be used in an aircraft to provide a deployable working/dining table for use by a passenger. Throughout the specification and figures, the table is described and shown as an amenity positioned in an individual passenger suite of a commercial airliner, however, it is envisioned that the table mechanism can be used in other conveyances and seating arrangements that can benefit from a non-linear and customizable table deployment path.

Figure 1:
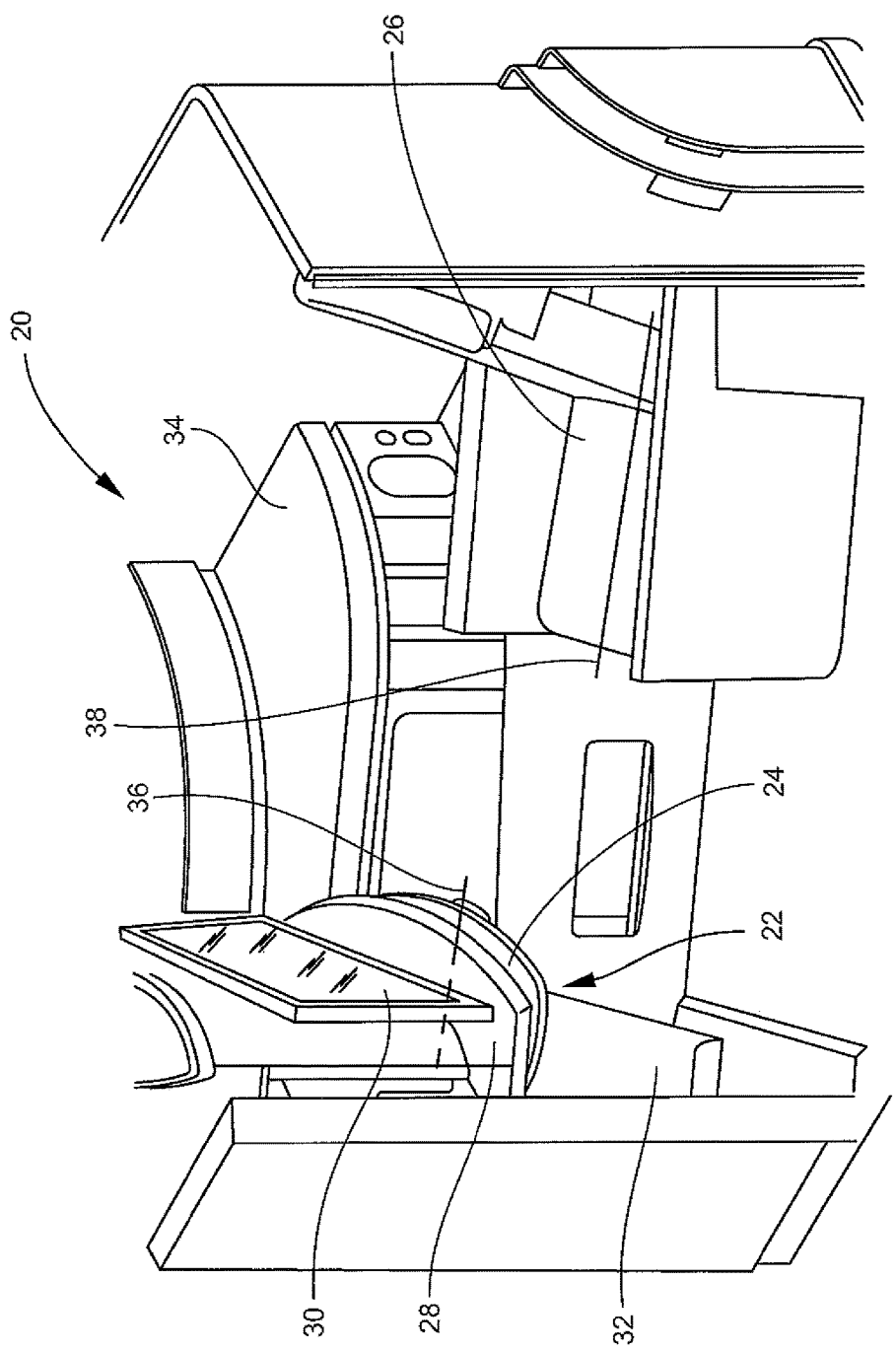
FIG. 1 is a perspective view of a passenger suite including a table assembly according to the present invention shown fully stowed forward of the seat.

FIG. 1 shows a passenger suite 20 equipped with a table assembly 22 including a movable table 24. The suite 20 can be installed in a luxury seating class onboard a commercial airliner. As shown, the suite 20 generally includes a recline/lie-flat capable seat 26, a desk 28 positioned directly forward of the seat, a video monitor 30 located above the desk, an ottoman 32 located below the desk, and a fixture 34 positioned to one side of the seat. The fixture 34 can be a console, dresser, cabinet, monument, etc., and extends generally from alongside the seat 26 to a position forward of the seat. The fixture 34 can have a horizontal top for supporting items thereon, and the base of the fixture can serve to locate seat controls, power connections, data connections, suite controls, cabling, etc. The fixture 34 further houses the guide pathways and tracks for guiding translational and rotational movement of a support arm of the table assembly 22, as discussed in detail below.

FIG. 1 shows the table 24 in a fully stowed and latched position. The table 24 is horizontally-oriented throughout its range of movement and stows underneath the desk 28 forward of the seat 26, thereby positioning the table apart from the seat and leaving open the space between the forward edge of the seat and the desk, while also allowing unobstructed use of the desk. The near edge of the table 24 can reside in the same vertical plane as the near edge of the desk 28, and the two near edges can have the same curvature for alignment and aesthetic purposes. In this position, the near edge of the table 24 is presented to the seated passenger for grabbing and deployment. In the fully stowed position, the longitudinal table axis 36 is parallel to the longitudinal seat axis 38.

Figure 2:
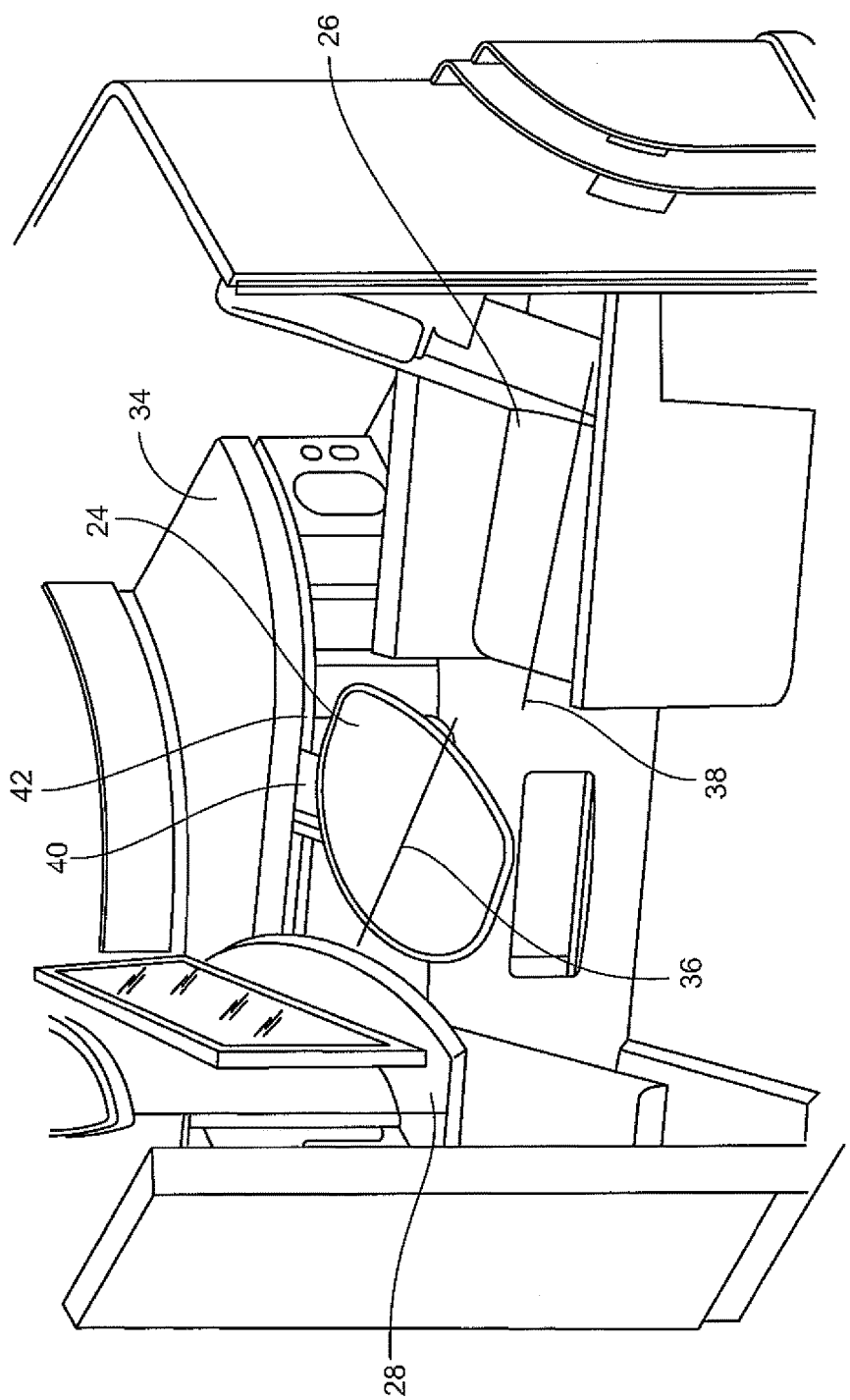
FIG. 2 shows an intermediate position of the table rotated relative to a support arm to maximize clearance between the table and the seat for exiting the seat.

FIG. 2 shows a first intermediate deployed position of the table 24 in which the support arm 40 is positioned about partway between the forward edge of the desk 28 and the forward edge of the seat 26, and the table 24 is rotated relative to the underlying support arm 40 such that the longitudinal table axis 36 is at an angle to the longitudinal seat axis 38. The table assembly 22 can be released from the latched position and moved to the first intermediate position by actuating a push-to-close/open latch discussed below. The table 24 can be moved toward the seated passenger by pulling on a handle located along the forward edge of the table. Pulling on the handle horizontally translates the support arm 40 along the length of the fixture 34 guided along tracks as discussed below. As the support arm 40 horizontally translates from the fully stowed position shown in FIG. 1 to the intermediate position shown in FIG. 2, the table 24 rotates in a first direction (e.g., clockwise) relative to the support arm to maximize clearance between the forward edge of the seat 26 and the table to allow the passenger to exit the seat without having to empty the table.

Figure 3:
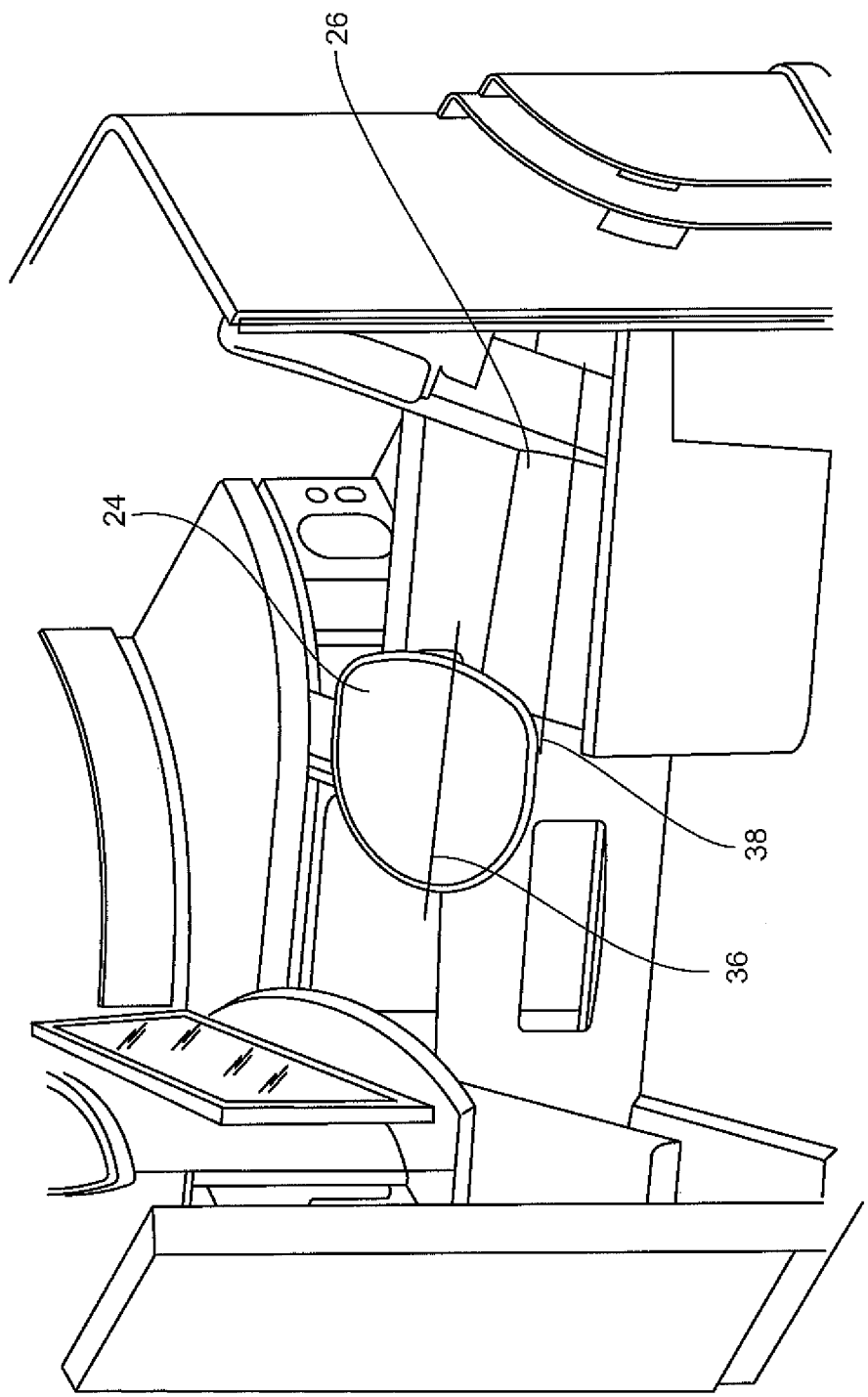
FIG. 3 shows the table rotated to a deployed use position for large passengers.

FIG. 3 shows a second intermediate position of the table 24 for accommodating large passengers. In this position, the forward edge of the table 24 is aligned near the forward edge of the seat 26 to position the table at an ergonomic position for large passengers. As the table 24 moves from the first intermediate position shown in FIG. 2 to the second intermediate position shown in FIG. 3, the table rotates in a second direction, opposite to the first direction (e.g., counterclockwise), relative to the underlying support arm 40 until the longitudinal table axis 36 is again parallel to the longitudinal seat axis 38.

Figure 4:
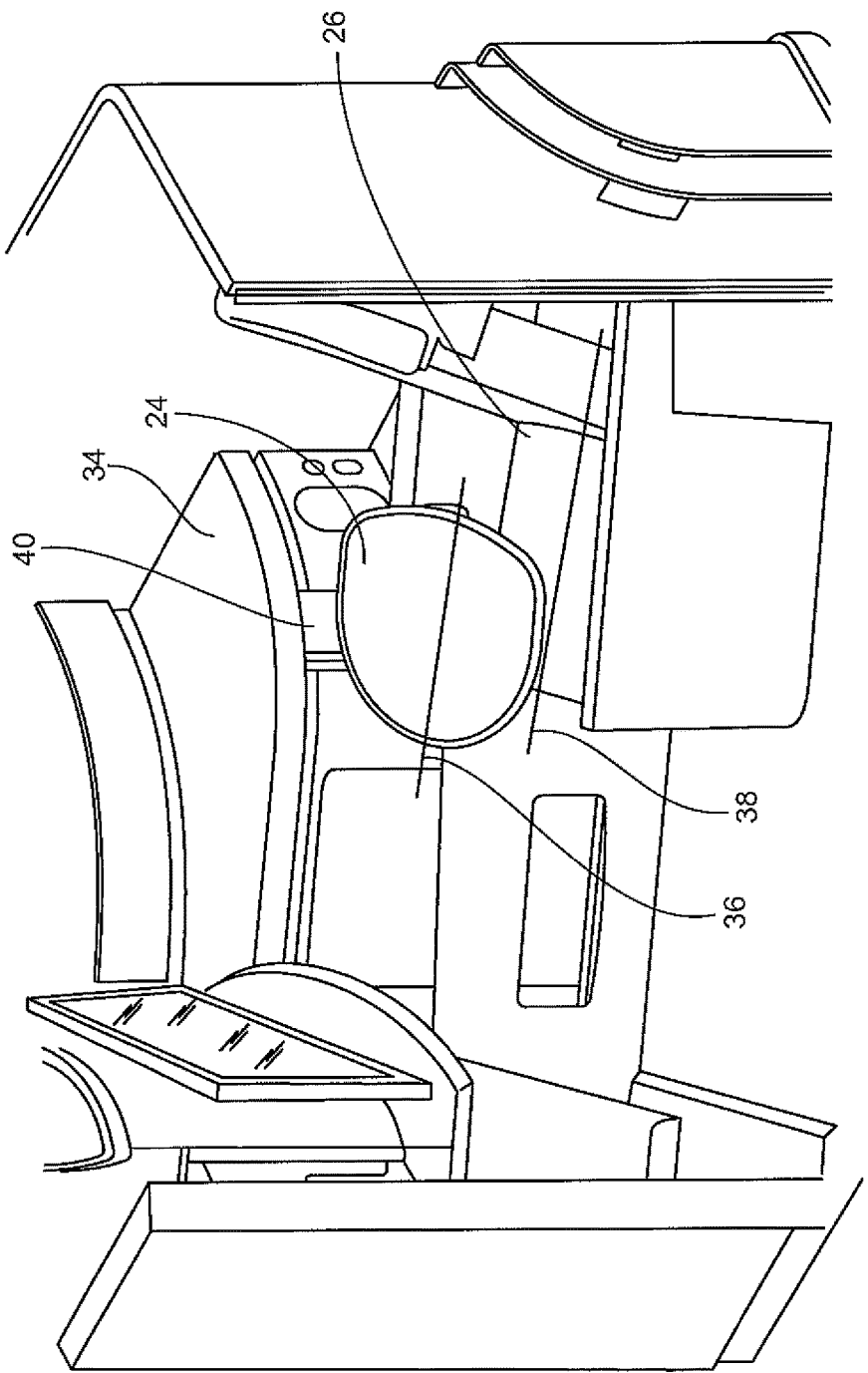
FIG. 4 shows the table rotated to a deployed use position for small passengers.

FIG. 4 shows a fully deployed position of the table 24 for small or standard sized passengers. In the fully deployed position, the table 24 is positioned closest to the seatback of the seat 26 at an ergonomic use position for small or standard sized passengers. As the fixture 34 curves in a direction away from the seat 26 nearest the seat, the support arm 40 rotates as it moves in a direction of the seat thereby driving table rotation in the second direction (e.g., counterclockwise) relative to the support arm 40, such that the longitudinal table axis 36 maintains parallel with the longitudinal seat axis 38.

The ratio of translational to rotational motion of the support arm along the travel path is determined by the length and shape of the fixture and position of the seat relative to the fixture. For example, the fixture as shown runs parallel to the seat farthest from the seat and curves in a direction away from the seat closest to the seat. As such, the shape of the fixture requires that the support arm translate horizontally near the fully stowed position and both translate and rotate near the fully deployed position. In an alternative embodiment in which the fixture remains parallel with the longitudinal seat axis along the entire length of the fixture, the support may be configured to horizontally translate without rotation, while the table would still be configured to rotate relative to the support arm to position the longitudinal table axis at an angle to the longitudinal seat axis when the table assembly is in the intermediate position.

Figure 5:
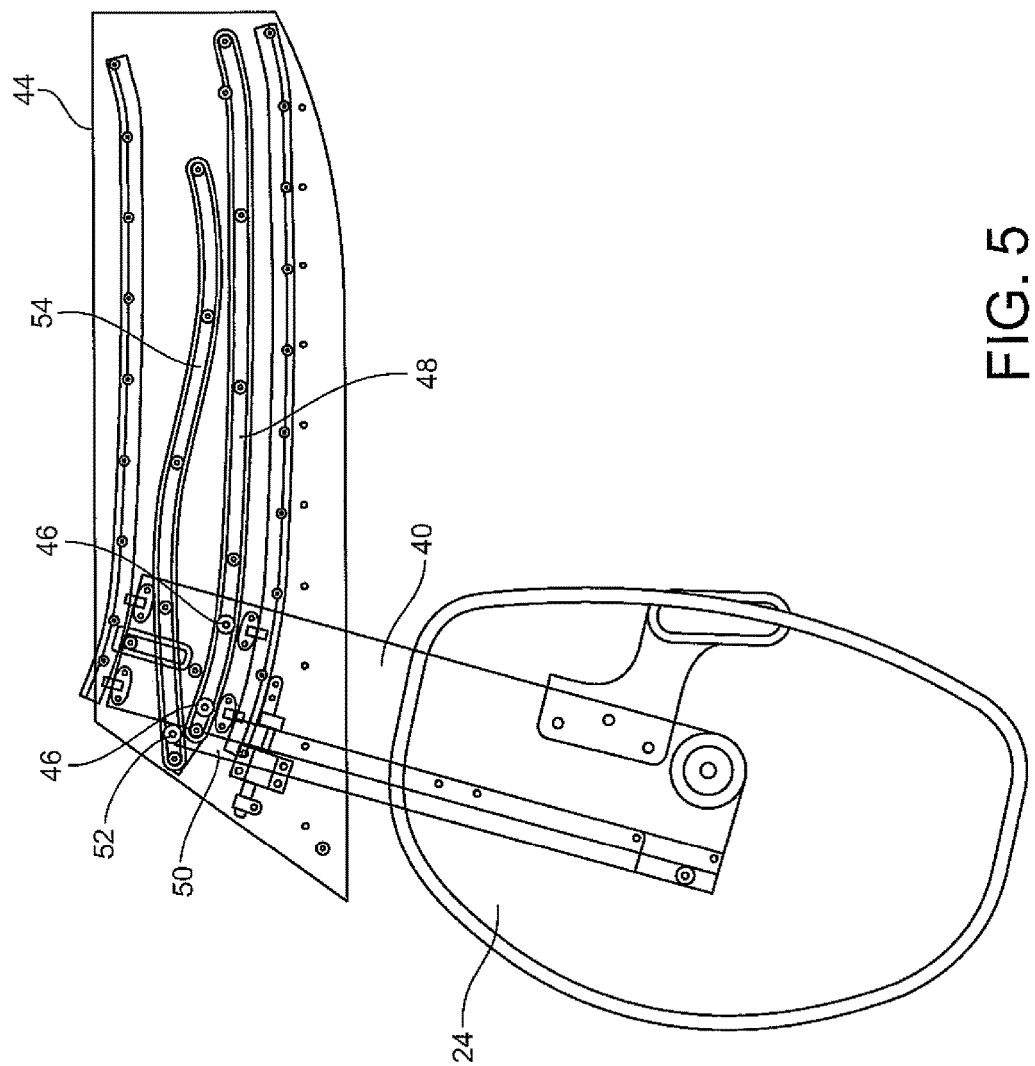
FIG. 5 is a top view of the table assembly showing support arm guide pathways and tracks.

FIG. 5 shows the table assembly 22 and the support arm guide pathways and tracks. One end of the support arm 40 supports the weight of the table 24, while the opposing end of the support arm is engaged within a plurality of guide pathways and tracks housed within the fixture. An elongate slot (see FIG. 2 at 42) can be formed through the side of the fixture to allow the support arm 40 to extend into the fixture to engage within the plurality of guide pathways and tracks. In this arrangement, the guide pathways and tracks and their engagement with the end of the support arm 40 are hidden from view and potential pinch points are concealed.

The guide pathways and tracks can be mounted to or formed in the top surface of a common plate 44 housed internally within the fixture. Vertically-oriented arm track rollers 46 rotatably carried on the bottom of the support arm 40 travel along a support arm cam pathway 48 as the support arm is moved toward and away from the seat. The shape of the support arm cam pathway 48 dictates lateral positioning and rotation of the support arm 40.

Movement of the support arm 40 toward and away from the seat further drives lateral movement of a rotation rod 50 arranged to drive table rotation relative to the support arm. One end of the rotation rod 50 opposite the table end carries a vertically-oriented roller 52 that travels along a rotation rod cam pathway 54 running alongside the support arm cam pathway 48. The support arm cam pathway 48 and the rotation rod cam pathway 54 are non-linear, non-intersecting, and shaped to respectively rotate the support arm 40 based on the predetermined curvature of the fixture, and rotate the table 24 based on the position of the support arm relative to the seat. The two pathways 48, 54 can be shaped and positioned relative to one another to customize support arm travel and table rotation to accommodate fixture and seat positioning within the suite.

Movement of the support arm 40 along the support arm pathway 48 causes the rotation rod 50 to translate relative to the support arm, thereby rotating the table 24 relative to the support arm. As shown in FIG. 5, as the support arm 40 moves from left to right, the support arm gradually rotates counterclockwise. At the same time, as the two pathways 48, 54 first diverge, the rotation rod 50 moves in a direction away from the table, thereby pulling on the table and causing the table to rotate clockwise. As the support arm 40 continues from left to right, the two pathways 48, 54 converge, thus driving the rotation rod 50 in the direction of the table thereby causing the table to rotate counterclockwise. As the support arm 40 nears the far right end of the two pathways 48, 54, the pathways again diverge and the rotation rod 50 drives the table rotation slightly clockwise to compensate for the rotation of the support arm to maintain parallelness of the table and seat axes. Viewed from left to right in FIG. 5, the far left position of the support arm 40 shown corresponds to the fully stowed position of the table 24, while a position of the support arm at the far right end of the two pathways 48, 54 corresponds to the fully deployed position of the table, and the at least one intermediate position in which the longitudinal table axis is at an angle to the longitudinal seat axis is therebetween.

Figure 6:
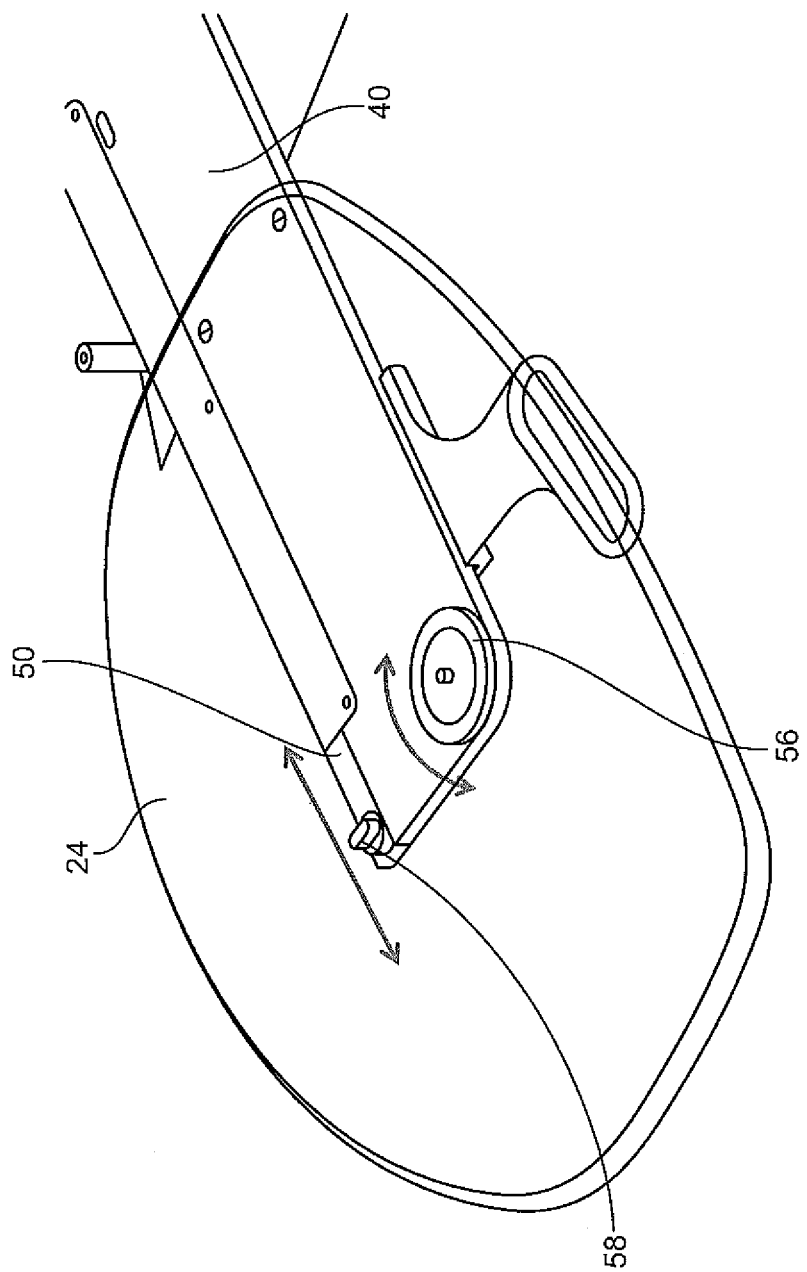
FIG. 6 shows rotational movement of the table relative to the support arm.

FIG. 6 shows the table 24 in transparency for clarity and to illustrate the translation of the rotation rod 50 relative to the support arm 40. As the rotation rod 50 translates relative to the support arm 40, the rotation rod 50 drives rotational movement of the table 24 about a main support bearing 56 by way of a bearing and slot arrangement 58. For example, the main support bearing 56 may support the weight and facilitate rotation of the table 24, while a connection at the end of the rotation rod to the table causes the table at that connection to be pulled and pushed by the rotation rod.

Figure 7:
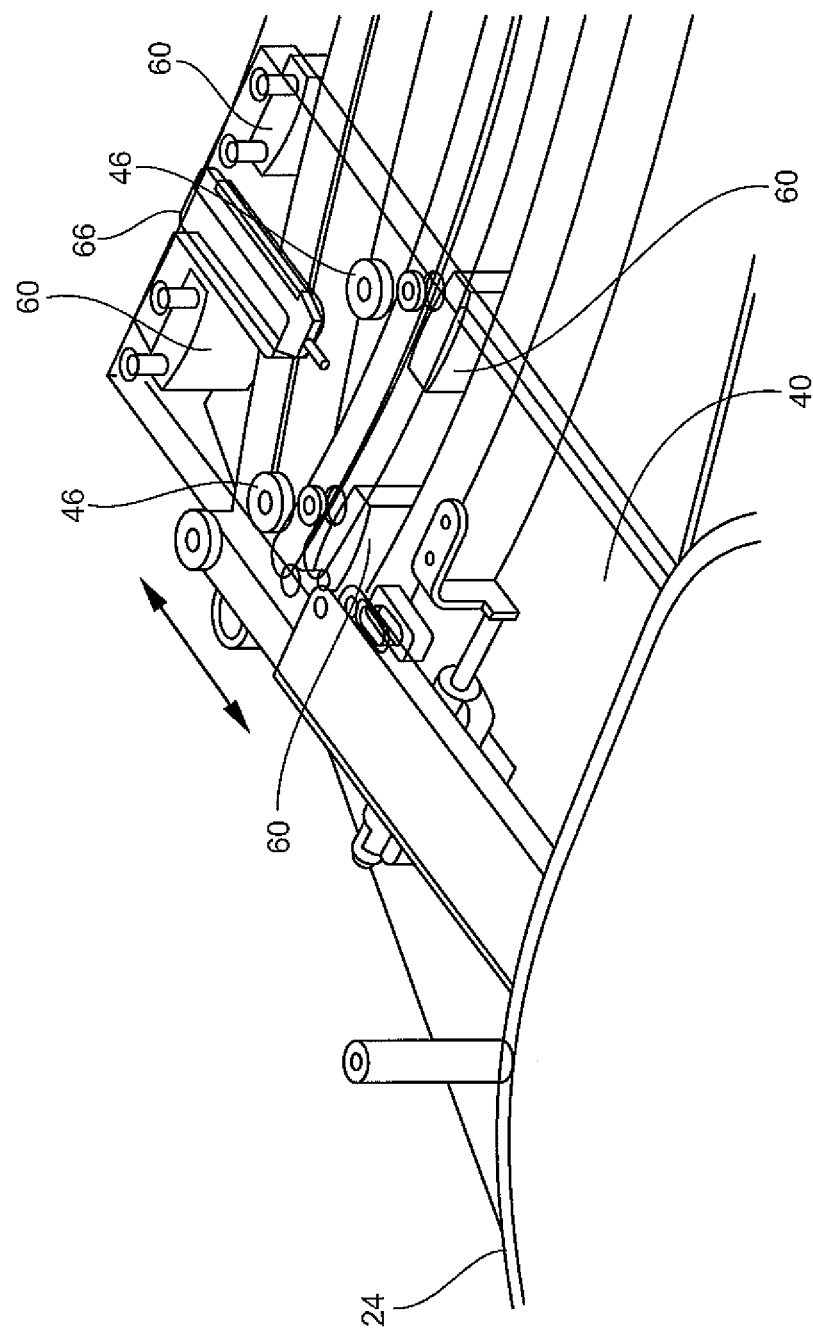
FIG. 7 is a detailed view of the end of the support arm showing the engagement thereof in the guide pathways and tracks.
Figure 8:
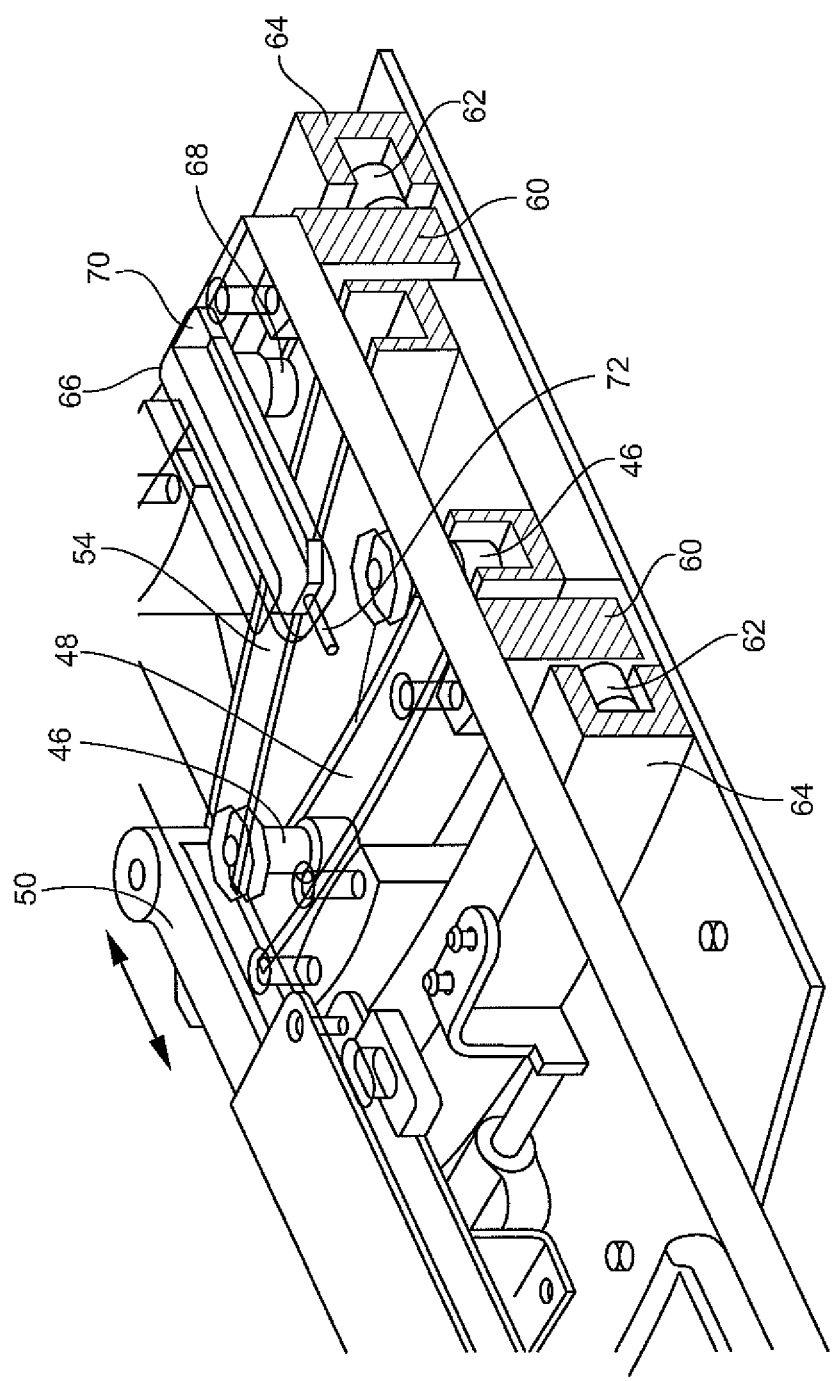
FIG. 8 is a detailed view showing support arm track and roller assemblies and a dampener.

FIGS. 7 and 8 show additional support arm 40 engagement and support with the guide pathways and tracks. A plurality of guide blocks 60 attached to the bottom of the support arm 40 travel outboard of the two guide pathways 48, 54. Horizontally-oriented track rollers 62 rotatably carried on the guide blocks 60 travel along parallel tracks 64 located outboard of the guide blocks 60, which are outboard of the two pathways 48, 54. The horizontal orientation of the track rollers 62 and side opening tracks 64 maintain the support arm 40 horizontal throughout its range of movement and prevent any tilting under loading.

A dampener assembly 66 for dampening and smoothing movement of the support arm 40 includes a vertically-oriented roller 68 rotatably mounted to a horizontal mounting plate 70 biased in the direction of the outboard one of the parallel tracks 64, for example. A spring 72 seated between the support arm 40 and the mounting plate 70 biases the roller 68 in the direction of a vertical wall of the respective parallel track 64. In this arrangement, the roller 68 is forced into contact with the parallel track 64 throughout the entire range of travel of the support arm 40. The roller 68 facilitates smooth movement between the support arm 40 and the parallel track 64 while preventing unrestricted movement (i.e., "free") travel of the support arm. It is envisioned that the table mechanism can include one or more dampeners arranged to engage any one of the parallel tracks 64, arm support cam path 48, and rotation rod cam pathway 54.

Figure 9:
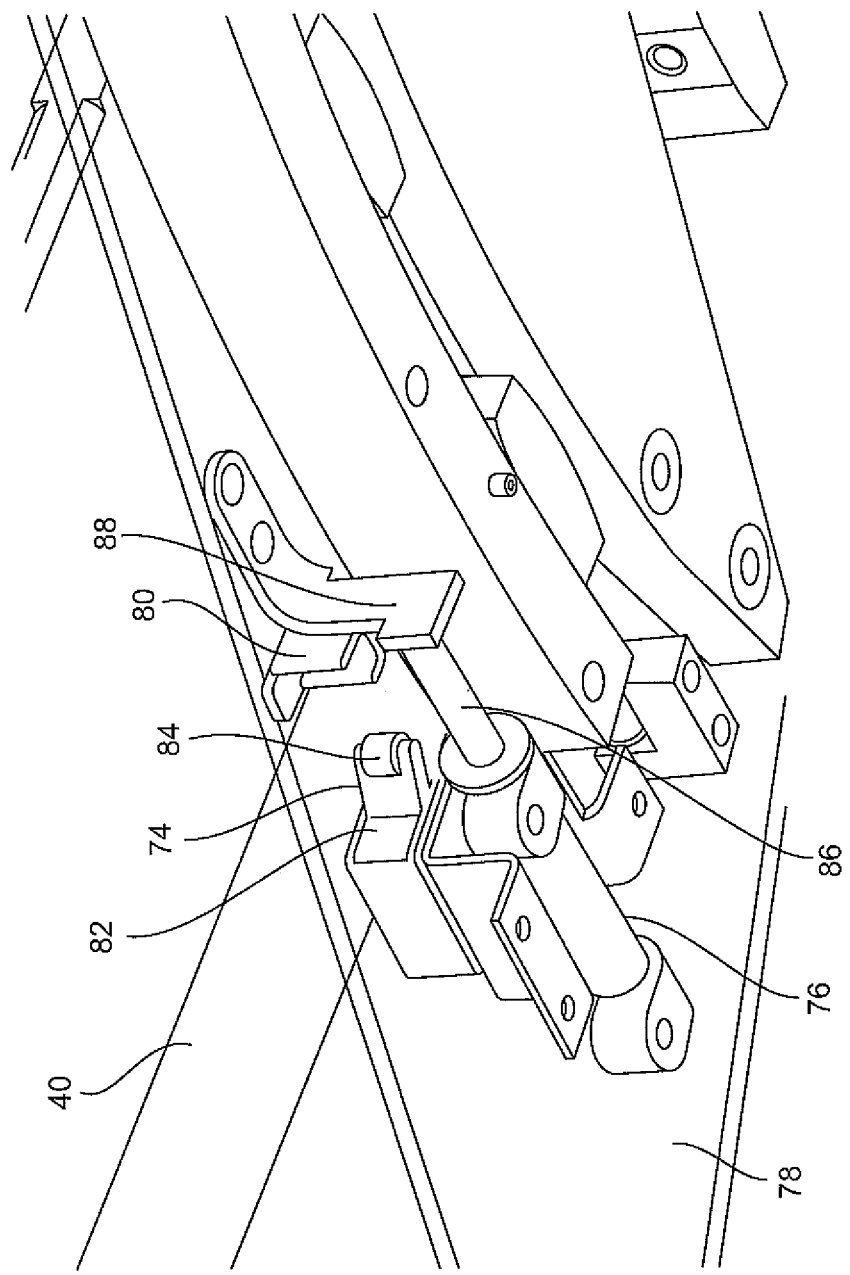
FIG. 9 is a bottom view of the support arm showing a push-to-open/close latch.

FIG. 9 shows a push-to-open/close latch 74 and pusher 76 for respectively latching and presenting the table for movement by the passenger. The latch 74 and pusher 76 can be mounted under the support arm 40 to a static base 78. A catch 80 mounted to the bottom of the support arm 40 is located to catch the latch 74 as the latch moves past the catch as the support arm is moved toward the fully stowed position. The latch 74 can be a rocker type latch, for example, having a spring-biased rocker 82 having a horizontally-mounted roller 84 rotatably mounted on one end thereof. In operation, the rocker 82 is urged in a first direction to load the spring as the rocker moves passed the catch 80, and once passed the urging portion of the catch, settles into the catch such that the spring force maintains the latch 74 and catch 80 together. The latch 74 is pulled from the catch 80, or vice versa, by exerting a pulling force (e.g., moving the support arm 40 toward the seat) sufficient to overcome the spring force such that the latch 74 can be pulled from the catch 80, or vice versa.

The pusher 76, which is mounted to the base 78, operates to present the unlatched table to the passenger. The pusher 76 includes a spring-loaded piston 86 arranged to urge against a pusher bracket 88 attached to the bottom of the support arm 40. When the table is fully stowed with the latch 74 engaged in the catch 80, the internal spring of the pusher 76 is compressed and energized. When the latch 74 is released, the stored force in the pusher 76 is released and the piston 86 extends to push the pusher bracket 88 away, thereby driving the support arm 40, and consequently the table, away from the fully stowed position.

Figure 10:
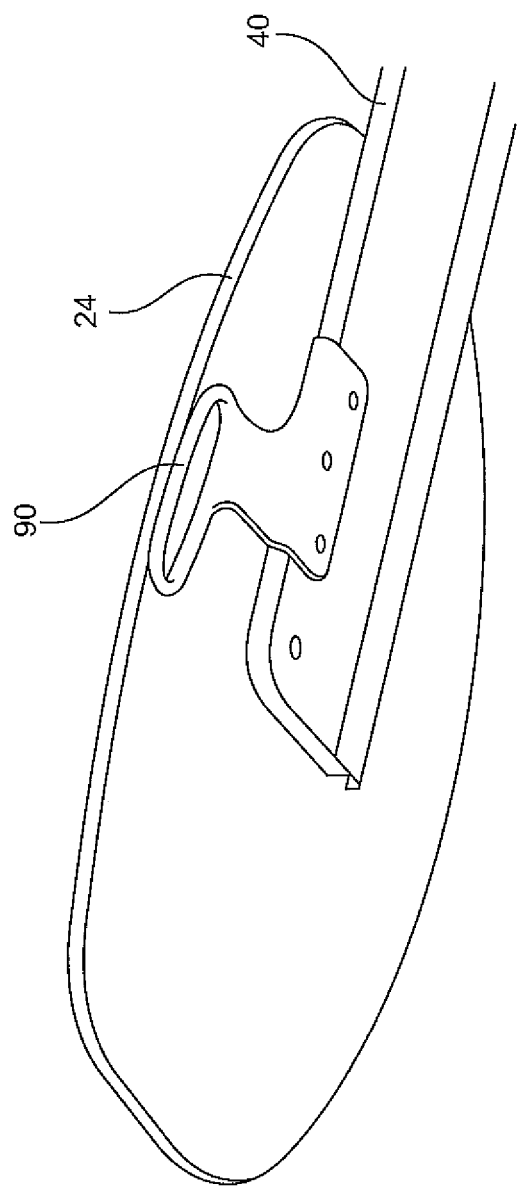
FIG. 10 shows a handle connected to the underside of the support arm.

FIG. 10 shows a handle 90 which can be mounted to the bottom of the support arm 40, or alternatively, to the bottom of the table 24. The handle 90 is located and functions to handle the table assembly to stow and deploy the table 24 as desired. In a preferred embodiment, the handle 90 is attached to the table 24 so as not to impede rotational movement of the table 24 as the table is moved between the fully stowed and fully deployed positions through the at least one intermediate position.

The particular pathway and track arrangement shown stably supports the support arm in a cantilevered orientation as the support arm travels forward and backward to follow the curvature of the console, i.e., a non-linear guide path. The rotation rod cam pathway can have a different curvature than the arm support cam pathway such that the table can be rotated in a predetermined direction depending on the position of the support arm along the length of the guide pathways. The pathways can be shaped and customized based on the desired travel path, fixture shape, etc. The table itself can be a one-piece table that does not fold, providing improved strength and deflection characteristics, as well as fewer moving parts, which improves reliability, manufacturing and assembly processes.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seat table assembly, comprising:
    a table movable between a fully stowed position and a fully deployed position through at least one intermediate position in which the table rotates relative to a support arm, wherein the table rotates in a first direction relative to the support arm as the table moves from the fully stowed position toward the at least one intermediate position, and rotates in a second direction opposite the first direction as the table moves from the at least one intermediate position toward the fully deployed position.

2. The passenger seat table assembly of claim 1, wherein the table is horizontally-oriented and rotatably supported on the support arm, and the support arm is guided for movement along a fixture adapted to be positioned alongside a seat.

3. The passenger seat table assembly of claim 1, wherein a longitudinal axis of the table is adapted to be oriented parallel to a longitudinal seat axis when the table is in the fully stowed position, the longitudinal axis of the table is adapted to be oriented parallel to a longitudinal seat axis when the table is in the fully deployed position, and the longitudinal axis of the table is adapted to be oriented at an angle to a longitudinal seat axis when the table is in the at least one intermediate position.

4. The passenger seat table assembly of claim 1, further comprising:
    a support arm cam pathway housed in a fixture shaped to guide support arm rotation as the support arm moves relative to the fixture; and
    a rotation rod cam pathway housed in the fixture shaped to guide movement of a rotation rod which controls rotation of the table relative to the support arm as the support arm moves relative to the fixture;
    wherein the support arm cam pathway and the rotation rod cam pathway are non-linear, non-intersecting, and shaped to rotate the support arm based on a predetermined curvature of the fixture and rotate the table based on a position of the support arm relative to a seat served by the passenger seat table assembly.

5. The passenger seat table assembly of claim 4, wherein movement of the rotation rod relative to the support arm drives rotational movement of the table about a main support bearing by way of a bearing and slot arrangement.

6. The passenger seat table assembly of claim 4, further comprising a plurality of guide blocks attached to an underside of the support arm that travel outboard of the support arm cam pathway and rotation rod cam pathway, and horizontally-oriented track rollers rotatably attached to the plurality of guide blocks that travel along parallel tracks positioned outboard of the guide blocks.

7. The passenger seat table assembly of claim 6, further comprising a damper assembly comprising a dampener having a vertically-oriented roller rotatably mounted thereto, the dampener mounted to a mounting plate biased in a direction of one of the parallel tracks, wherein the vertically-oriented roller is forced into contact with the one of the parallel tracks through a range of travel of the support arm.

8. The passenger seat table assembly of claim 4, wherein a slot is formed through a side of the fixture and one end of the support arm extends through the slot into the fixture to engage within the support arm cam pathway and the rotation rod cam pathway.

9. The passenger seat table assembly of claim 1, further comprising:
    a handle mounted to an underside of the support arm or an underside of the table; and
    a catch mounted to the underside of the support arm or the underside of the table arranged to catch a latch as the latch moves past the catch as the support arm moves toward the fully stowed position.

10. An aircraft passenger suite, comprising:
a seat;
a fixture positioned to one side of the seat; and
a table assembly comprising a table movable between a fully stowed position forward of the seat and a fully deployed position over the seat through at least one intermediate position in which the table rotates relative to a support arm to provide room for a passenger to exit the seat between the seat and the table without having to fully stow the table;
wherein the table rotates in a first direction relative to the support arm as the table moves from the fully stowed position toward the at least one intermediate position, and rotates in a second direction opposite the first direction as the table moves from the at least one intermediate position toward the fully deployed position.

11. The aircraft passenger suite of claim 10, wherein the table is horizontally-oriented and rotatably supported on the support arm, and a slot is formed through a side of the fixture and one end of the support arm extends through the slot into the fixture and is guided for horizontal movement along the fixture.

12. The aircraft passenger suite of claim 10, wherein a longitudinal axis of the table is parallel to a longitudinal axis of the seat when the table is in the fully stowed position, the longitudinal axis of the table is parallel to the longitudinal axis of the seat when the table is in the fully deployed position, and the longitudinal axis of the table is at an angle to the longitudinal axis of the seat when the table is in the at least one intermediate position.

13. The aircraft passenger suite of claim 10, further comprising:
a support arm cam pathway housed in the fixture shaped to guide support arm rotation as the support arm moves relative to the fixture; and
a rotation rod cam pathway housed in the fixture shaped to guide movement of a rotation rod which controls rotation of the table relative to the support arm as the support arm moves relative to the fixture;
wherein the support arm cam pathway and the rotation rod cam pathway are non-linear, non-intersecting, and shaped to rotate the support arm based on a predetermined curvature of the fixture and rotate the table based on a position of the support arm relative to the seat.

14. The aircraft passenger suite of claim 13, wherein movement of the rotation rod relative to the support arm drives rotational movement of the table about a main support bearing by way of a bearing and slot arrangement.

15. The aircraft passenger suite of claim 13, further comprising a plurality of guide blocks attached to an underside of the support arm that travel outboard of the support arm cam pathway and rotation rod cam pathway, and horizontally-oriented track rollers rotatably attached to the plurality of guide blocks that travel along parallel tracks positioned outboard of the guide blocks.

16. The aircraft passenger suite of claim 15, further comprising a damper assembly comprising a dampener having a vertically-oriented roller rotatably mounted thereto, the dampener mounted to a mounting plate biased in a direction of one of the parallel tracks, wherein the vertically-oriented roller is forced into contact with the one of the parallel tracks through a range of travel of the support arm.

17. The aircraft passenger suite of claim 10, further comprising a desk positioned forward of the seat, wherein the table stows underneath the desk when the table is in the fully stowed position.

18. The aircraft passenger suite of claim 10, further comprising:
a handle mounted to an underside of the support arm or an underside of the table; and
a catch mounted to the underside of the support arm or the underside of the table arranged to catch a latch as the latch moves past the catch as the support arm moves toward the fully stowed position.

* * * * *